US006291974B1

(12) United States Patent
Matsuo

(10) Patent No.: US 6,291,974 B1
(45) Date of Patent: Sep. 18, 2001

(54) ELECTRONIC STROBE

(75) Inventor: Takumi Matsuo, Ichikawa (JP)

(73) Assignee: Ri-Ki Wood, Ibaraki (JP)

( * ) Notice: Subject to any disclaimer, the term of this patent is extended or adjusted under 35 U.S.C. 154(b) by 0 days.

(21) Appl. No.: 09/750,587

(22) Filed: Dec. 28, 2000

(51) Int. Cl.[7] .......... H01M 10/46
(52) U.S. Cl. .......... 320/166
(58) Field of Search .......... 320/137, 140, 320/166, 167, DIG. 28; 315/241 P

(56) References Cited

U.S. PATENT DOCUMENTS 3,822,393 * 7/1974 Karpol .
5,780,976 7/1998 Matsuo .

* cited by examiner

*Primary Examiner*—Edward H. Tso
(74) *Attorney, Agent, or Firm*—Welsh & Katz, Ltd.

(57) ABSTRACT

In the constant-voltage automatic charging strobe circuit (100), the power circuit (20) for driving the automatic exposure mechanism rectifies the AC voltage generated in the collector of the oscillation control transistor (Q1) connected to the primary side of the step-up transformer (T1) to direct current by means of the rectifying diode (D4), smoothes the current by means of the capacitor (C3), and generates a DC secondary source. This DC secondary source is stepped up to a higher voltage than the battery voltage (VB), through the transistor (Q2) that is turned on and off by the phototransistor (PH1) for determining the level of ambient light, and is supplied as the source for driving the aperture control solenoid (RE1).

16 Claims, 11 Drawing Sheets

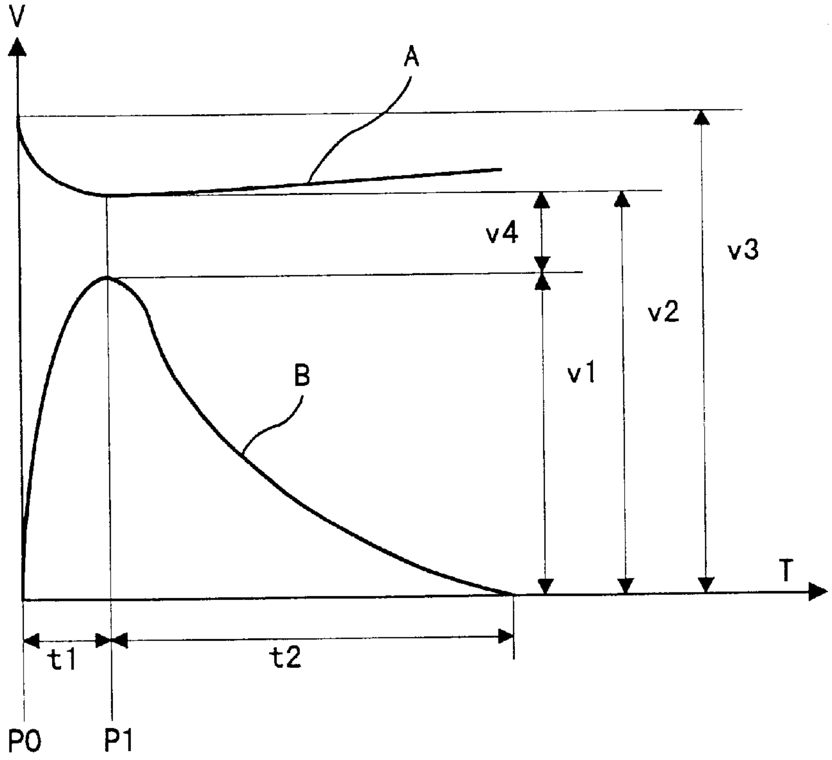

A : CHARGE AND DISCHARGE CURVE OF C1
B : CHARGE AND DISCHARGE CURVE OF C4
t1 : DISCHARGE TIME OF C1, CHARGE TIME OF C4, FLASHING TIME OF Xe1
t2 : NATURAL CHARGE TIME OF C1, DISCHARGE TIME OF C4
v1 : MAXIMUM CHARGING VOLTAGE OF C4
v2 : DISCHARGE STOPPING VOLTAGE OF C1
v3 : CHARGING VOLTAGE OF C1
v4 : POTENTIAL DIFFERENCE BETWEEN ANODE AND CATHODE OF Xe1
P0 : FLASH STARTING POSITION OF Xe1
P1 : FLASH STOPPING POSITION OF Xe1 (v4 MINIMUM POINT)

FIG 4

TYPE A VR = 30 V (V)

| R \ $I_R$ | LED LIGHTING STARTS | 1 mA | 1.4 mA |
|---|---|---|---|
| 223 | 126 | 159 | 169 |
| 473 | | 184 | 202 |
| 104 | | 238 | 277 |
| 154 | | 286 | 345 |

FIG 6(a)

TYPE D VR = 75 V (V)

| R \ $I_R$ | LED LIGHTING STARTS | 1 mA | 1.4 mA |
|---|---|---|---|
| 223 | 124 | 151 | 161 |
| 473 | | 175 | 196 |
| 104 | | 227 | 269 |
| 154 | | 278 | 337 |

FIG 6(d)

TYPE B VR = 40 V (V)

| R \ $I_R$ | LED LIGHTING STARTS | 1 mA | 1.4 mA |
|---|---|---|---|
| 223 | 63 | 86 | 95 |
| 473 | | 110 | 130 |
| 104 | | 165 | 204 |
| 154 | | 213 | 271 |

FIG 6(b)

TYPE E VR = 100 V (V)

| R \ $I_R$ | LED LIGHTING STARTS | 1 mA | 1.4 mA |
|---|---|---|---|
| 223 | 160 | 189 | 199 |
| 473 | | 213 | 233 |
| 104 | | 265 | 309 |
| 154 | | 316 | 362 |

FIG 6(e)

TYPE C VR = 60 V (V)

| R \ $I_R$ | LED LIGHTING STARTS | 1 mA | 1.4 mA |
|---|---|---|---|
| 223 | 125 | 160 | 169 |
| 473 | | 184 | 203 |
| 104 | | 237 | 278 |
| 154 | | 286 | 345 |

FIG 6(c)

TYPE A × 2 VR = 30 V (V)

| $I_R$ / R | LED LIGHTING STARTS | 1 mA | 1.4 mA |
|---|---|---|---|
| 223 | 257 | 300 | 311 |
| 473 | | 325 | 345 |

FIG 7(a)

TYPE C × 2 VR = 60 V (V)

| $I_R$ / R | LED LIGHTING STARTS | 1 mA | 1.4 mA |
|---|---|---|---|
| 223 | 251 | 294 | 304 |
| 473 | | 319 | 340 |

FIG 7(c)

TYPE B × 2 VR = 30 V (V)

| $I_R$ / R | LED LIGHTING STARTS | 1 mA | 1.4 mA |
|---|---|---|---|
| 223 | 125 | 149 | 159 |
| 473 | | 173 | 193 |
| 104 | | 226 | 267 |
| 154 | | 274 | 335 |

FIG 7(b)

TYPE D × 2 VR = 75 V (V)

| $I_R$ / R | LED LIGHTING STARTS | 1 mA | 1.4 mA |
|---|---|---|---|
| 223 | 241 | 276 | 290 |
| 473 | | 301 | 325 |

FIG 7(d)

TYPE E × 2 VR = 100 V (V)

| $I_R$ / R | LED LIGHTING STARTS | 1 mA | 1.4 mA |
|---|---|---|---|
| 223 | 308 | 348 | 362 |

FIG 7(e)

TYPE B + TYPE E VR = 140 V (V)

| $I_R$ / R | LED LIGHTING STARTS | 1 mA | 1.4 mA | 2 mA |
|---|---|---|---|---|
| 223 | 222 | 254 | 226 | 283 |
| 333 | | 266 | 283 | 306 |
| 393 | | 272 | 291 | 317 |
| 433 | | 275 | 297 | 325 |
| 473 | | 279 | 301 | 331 |

FIG 7(f)

ELECTRONIC STROBE

BACKGROUND OF THE INVENTION

1. Field of the Invention

The present invention relates to a constant-voltage automatic charging strobe circuit used as the strobe unit circuit for easy-use cameras such as disposable cameras, compact cameras, or digital still cameras.

2. Description of the Related Art

In general, most of the compact cameras on the market are equipped with an automatic exposure function and use a battery with nominal voltage of 3 volts or greater.

In the circuit block of the camera, the automatic exposure circuit is generally constituted so as to be within the shutter block and to operate at timing that is shifted from the timing of the strobe circuit block in a series of camera operations. The power source may be either a 3-volt power source without further enhancement, or converted once to 4 volts or 5 volts by a DC/DC converter.

Also, for a nominal battery voltage of 1.5 volts it is necessary to provide a solenoid of corresponding size in order to operate the aperture blades of the camera exposure mechanism, for example. Because of the high current flowing to the solenoid, the number of parts becomes large and the time until battery replacement also becomes shortened in practical application.

Next, when considering a constant-voltage strobe circuit, the basic operating manners are all the same, namely, detect the charging voltage of a main capacitor, turn off a power switching transistor (oscillation control transistor) connected to the primary side of a transformer when an established voltage is reached, and effect oscillation and stop charging. To realize the means for detecting the abovementioned charging voltage, there are the method of using a voltage detecting element such as a Zener diode, a varistor or neon lamp, and the method of preparing an intermediate tap on the secondary winding side of the transformer, using the output voltage generated thereby and turning off the oscillation control transistor. Furthermore, combinations of these methods may be used. However, circuits to which these methods are applied all have complex structures and become expensive.

Also, the method for automatically controlling the quantity of light emitted by the strobe uses a parallel control circuit or serial control circuit for controlling the quantity of light using a thyristor or quench tube. Furthermore, in recent years, the method for controlling the photocurrent flowing directly to a xenon tube by using IGBT as a new power device is becoming mainstream.

Using these circuits makes it possible to attain a continuously stable quantity of light corresponding to changes in distance. However, these have a large number of circuit elements and the main device is expensive. As a result, the low price that is one of the merits of easy-use cameras does not materialize. In view of this situation, many types of the easy-use cameras that are currently available use manually controlled circuits having no light-quantity correction circuits.

In this way, in conventional compact cameras, it is necessary to select batteries with high nominal voltages or to use complex and large-scale circuitry to attain the high driving current in order to drive the load (solenoid, etc.) for operating the aperture blades and so forth in the automatic exposure mechanism. The problem is that with this type of load, cost increases are unavoidable and battery life has to become short.

Also, in conventional compact cameras, an automatic oscillation stopping circuit, for turning off the oscillation control transistor upon detecting a set voltage and causing the oscillation action to stop, is generally realized by using a voltage detecting element such as a Zener diode, or by using a more complex circuit with an intermediate tap connected to the secondary winding side of a transformer, using the output voltage generated thereby, and turning off the oscillation control transistor. As a result, the problem is that cost increases for the camera as a whole are brought about by the cost increases from this circuitry.

Also, conventional cameras include those having a circuit for automatically controlling the quantity of light emitted by the strobe that controls the quantity of light emitted by the strobe circuit using a thyristor or quench tube. Because these circuits include many circuit elements and the price of the main device is also high, it is not practical to include this in an inexpensive camera and these types of inexpensive cameras therefore do not have a function for preventing overexposure when taking strobe pictures at close range.

SUMMARY OF THE INVENTION

It is an object of the present invention to provide a constant-voltage automatic charging strobe circuit that does not use a battery of a high nominal voltage or a complex and large-scale circuit in order to attain high driving current for driving the aperture blades of an automatic exposure function or driving the load to effect mechanical operations, thereby to retain the low costs of the cameras having these types of loads and enable long battery life.

It is another object of the present invention to provide a constant-voltage automatic charging strobe circuit that does not use a Zener diode for an automatic oscillation stopping circuit that turns off the oscillation control transistor and causes oscillation to stop upon the detection of a set voltage, and that can have a circuit configuration that is as simple as possible and keeps down the costs of that circuit part.

It is still another object of the present invention to provide a constant-voltage automatic charging strobe circuit capable of providing a function for correcting the quantity of light when taking strobe pictures at close range, without increasing the cost of the inexpensive cameras.

In order to achieve the abovementioned objects, a first aspect of the invention is a constant-voltage automatic charging strobe circuit in which battery voltage is stepped up by a step-up transformer and charges a main capacitor connected to a secondary side of the step-up transformer, while a flashing element connected in parallel with the main capacitor is caused to flash by the discharge current from the main capacitor, comprising a load for effecting mechanical operations; and a secondary power circuit for rectifying to direct current an AC voltage generated in collector of an oscillation control transistor connected to a primary side of the step-up transformer and generating a DC secondary source that has been stepped up higher than the battery voltage, wherein the load is driven by the DC secondary source.

With this first aspect of the invention, because the direct current secondary power source for the load which effects mechanical operations is generated within the strobe circuit, the load on the battery power source is lessened by this secondary power source, and batteries with a low nominal voltage can be used. Also, because of the reductions in the direct power consumption for driving the load supplied from the battery power source, it becomes possible to extend battery life.

Furthermore, the circuit can be constituted of a very small number of elements such as rectifying elements, smoothing elements, and amplifying elements and it becomes possible to keep down the cost increases while providing a load for effecting mechanical operations.

A second aspect of the present invention comprises that in the first aspect of the present invention, the constant-voltage automatic charging strobe circuit, further comprises a light-quantity correction circuit that has another capacitor connected serially between the main capacitor and the flashing element; and a light-quantity correction switch that can be switched between a make state in which the another capacitor is short circuited and a break state in which the short circuit of the another capacitor is eliminated; wherein, when the flashing element is caused to flash with the light-quantity correction switch in the break state, the another capacitor is temporarily charged by the discharge current from the main capacitor, thereby reducing the difference in potential within the flashing element and stopping the discharge of the main capacitor.

With this second aspect of the present invention, discharge of the main capacitor, in effect the flashing by the flashing element, can be stopped while in process, and overexposure during strobe photography at close range can be prevented by an operation to put it to the light-quantity correction switch in the break state, as necessary, when taking strobe pictures at close range.

Also, because of the inexpensive circuit configuration using a small number of elements, it is very useful for establishing a light-quantity correction switch function for strobe photography at close range in an inexpensive camera without greatly increasing the costs thereof.

A third aspect of the present invention comprises that in the first and second aspect of the present invention, the constant-voltage automatic charging strobe circuit further comprise an automatic oscillation stopping circuit for turning off the oscillation control transistor to stop an oscillation operation when the charging voltage of the main capacitor reaches a prescribed set voltage, with a set voltage detecting circuit portion thereof being constituted using a switching diode.

With the third aspect of the present invention, it becomes possible to reduce the cost of the circuit and to improve the versatility of the circuit design, in comparison with conventional circuits using Zener diodes that are expensive and not widely available, because of using an inexpensive switching diode that is widely available as the voltage detecting control part.

BRIEF DESCRIPTION OF THE DRAWINGS

FIG. 4 is a diagram showing the charge and discharge properties of the capacitors C1 and C4 during xenon lamp Xe1 discharge;

FIGS. 6(*a*) through 6(*e*) are tables showing the results of testing the switching diode elements used in the test for evaluating the properties using the circuit shown in FIG. 5(*a*);

FIGS. 7(*a*) through 7(*f*) are tables showing the results of testing the switching diode elements used in the test for evaluating the properties using the circuit shown in FIG. 5(*b*);

DESCRIPTION OF THE PREFERRED EMBODIMENTS

The preferred embodiments of the present invention are explained in detail below with reference to the attached drawings.

Figure 1:
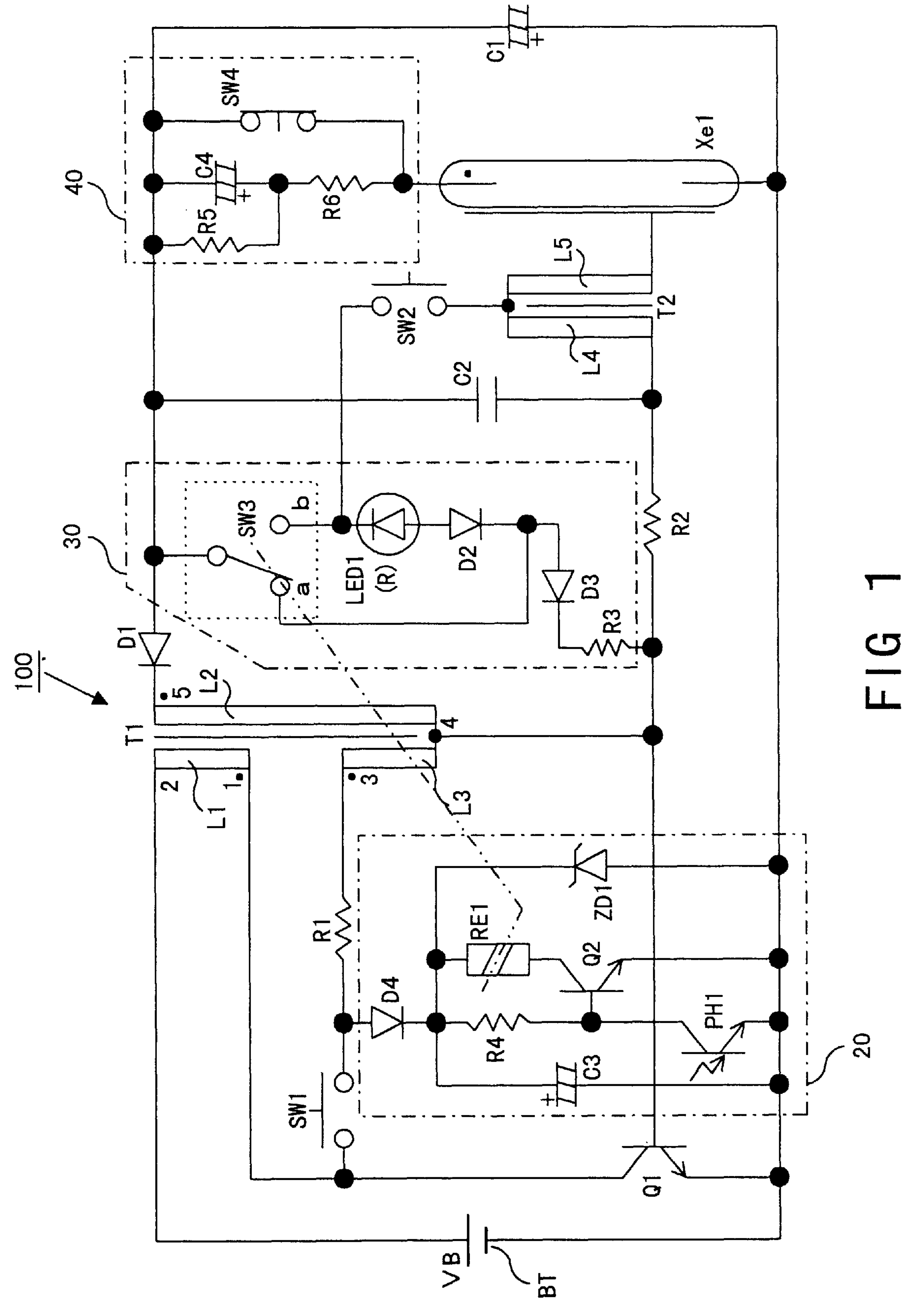
FIG. 1 is a circuit diagram showing the configuration of the constant-voltage automatic charging strobe circuit according to the present invention.

FIG. 1 is a circuit diagram showing the configuration of the constant-voltage automatic charging strobe circuit 100 according to the first embodiment of the present invention. This strobe circuit 100 is used as the flashing apparatus for a easy-use camera or disposable camera, for example.

In this strobe circuit 100, a battery BT, step-up transformer T1, rectifying diode D1, resistor R1, oscillation starting switch SW1, and oscillation control transistor Q1 form the voltage-booster circuit.

The step-up transformer T1 comprises three coils: a primary side coil L1, a secondary side coil L2, and a negative feedback coil L3, for one core. The positive terminal of the primary side coil L1 (terminal marked with a dot) 1 is connected to the collector of the transistor Q1, and to the positive terminal (terminal marked with a dot) 3 of the negative feedback coil L3 through the switch SW1 and resistor R1. The negative terminal of the primary side coil L1 (terminal not marked with a dot) 2 is connected to the positive electrode of the battery BT. The negative electrode of the battery BT and the emitter of the transistor Q1 are connected together.

On the other hand, the negative terminal of the diode D1 is connected to the positive terminal (terminal marked with a dot) 5 of the secondary side coil L2. The negative feedback coil L3 and the negative terminal (terminal not marked with a dot) 4 of the secondary side coil L2 are connected to the base of the transistor Q1.

The positive terminal of the diode D1 and the emitter of the transistor Q1 are connected to either end of the main capacitor C1.

The circuit block marked with the number 20 forms the power circuit for driving the automatic exposure mechanism (hereinafter referred to as "power circuit") that is one of the properties of the configuration of the present invention.

This power circuit 20 comprises the diode D4, resistor R4, capacitor C3, phototransistor PH1, transistor Q2, Zener diode ZD1, and solenoid RE1.

The phototransistor PH1 turns on when the quantity of ambient light exceeds a prescribed threshold value and turns off when the quantity of ambient light is at or below the threshold value. Consequently, appropriately setting the threshold value makes it possible to determine whether the quantity of ambient light is bright enough that the strobe is not necessary or low enough that the strobe is necessary, based on the on and off output of the phototransistor PH1.

The transistor Q2 operates so as to become off when the phototransistor PH1 is on and on when the phototransistor PH1 is off. Furthermore, the solenoid RE1 is turned on and off as the transistor Q2 is turned on and off.

The solenoid RE1 is the load for effecting mechanical operations. In particular, in the present embodiment, the solenoid operates the aperture blades (not shown) of the automatic exposure function of the camera including the strobe circuit 100 and generates the minimum aperture state and the open aperture state.

As understood from the circuit configuration of the power circuit 20 in FIG. 1, the power circuit in the present embodiment is designed so that the solenoid RE1 is off and the aperture blades are held in the minimum aperture state when the ambient light is bright and the phototransistor PH1 is turned on, and the solenoid RE1 is on and the aperture blades are held in the open aperture state when the ambient light is low and the phototransistor PH1 is turned off.

Also, in this strobe circuit 100, a main capacitor C1 charged by the secondary side output of the step-up transformer T1 and a flash trigger circuit that controls the discharge timing from the main capacitor C1 and initiates the flashing operation of the flashing element are formed on the secondary side of the step-up transformer T1.

The flash trigger circuit comprises: a resistor R2 connected to the negative terminal 4 of the secondary side coil L2 and the negative feedback coil L3 of the step-up transformer T1; a trigger capacitor C2 that is connected in parallel to the step-up transformer T1 between one end of the resistor R2 and the positive terminal of the diode D1; a circuit block 30 connected in parallel to the same step-up transformer T1; a serial circuit of a trigger transformer T2 and trigger switch SW2 connected in parallel to the circuit block 30; and a serial circuit of the circuit block 40 and flashing element (xenon lamp Xe1) connected in parallel to the capacitor C1.

The trigger transformer T2 comprises a primary side coil L4 and a secondary side coil L5; the secondary side coil L5 is connected to the trigger electrode of the xenon lamp Xe1.

Like the oscillation starting switch SW1, a non-locking make switch, that remains in the break state at its position only when pressed and automatically returns to the original make state if the pressing is released, is used as the trigger switch SW2.

In the flash trigger circuit, the circuit block 30 forms an automatic oscillation stopping circuit that is one of the properties of the configuration of the present invention. The circuit block 40 likewise forms a close range light-quantity correction circuit.

Therein, the automatic oscillation stopping circuit 30 comprises a switch SW3 for switching aperture blade linkage, a light emitting diode LED1, switching diodes D2, D3, and a resistor R3.

In this automatic oscillation stopping circuit 30, the switch SW3 for switching aperture blade linkage links to the minimum aperture state and open aperture state of the aperture blades driven by the solenoid RE1 and is switched between the contact a side and contact b side.

In the present embodiment, the switch SW3 is switched according to the operating conditions of the solenoid RE1 discussed above, so that it contacts the contact a side ordinarily when the solenoid RE1 is off (bright ambient light) and contacts the contact b side only when the solenoid RE1 is on.

Accordingly, when the switch SW3 is switched to the contact a side, the xenon lamp Xe1 does not flash even if the trigger switch SW2 is pressed. The xenon lamp Xe1 flashes due to the pressing of the trigger switch SW2 only when the switch SW3 is switched to the contact b side.

Meanwhile, the close range light-quantity correction circuit 40 comprises a close range strobe photography light-quantity correction switch (hereinafter referred to as "light-quantity correction switch") SW4, capacitor C4, resistor R5, and resistor R6.

In this close range light-quantity correction circuit 40, the light-quantity correction switch SW4 is normally set to a conducting state (make state: state shown in FIG. 1) and is switched to the break state during strobe photography at close ranges.

The switching of this light-quantity correction switch SW4 from the make state to the break state can be accomplished manually by the user. The configuration may also be such that it is automatically switched using a semiconductor power device or a magnetic relay driven by a range signal from an autofocus mechanism (not shown) of the camera including this strobe circuit 100.

Moreover, of the switches other than the abovementioned switches SW3 and SW4, the oscillation starting switch SW1 is a non-locking make contact switch linked to the film winding lever or release button (neither is shown) of the camera including this strobe circuit 100 according to the present embodiment.

This oscillation starting switch SW1 is turned on during film winding with the film winding lever and is turned off when winding ends. Also, this switch is turned on when the release button is pressed and is turned off when that button is released. This functions as a switch for causing the strobe to oscillate when it is turned on.

Also, the trigger switch SW2 is a switch for triggering the timing for the flashing by the xenon lamp Xe1. Like the oscillation starting switch SW1, this is a non-locking make contact switch. This trigger switch SW2 is linked to the shutter blades (not shown) and so forth and is turned on when the release button is pressed.

The operation of the strobe circuit 100 according to the present embodiment is explained next.

In this strobe circuit 100, when film winding with the film winding lever begins, the oscillation starting switch SW1 is turned on and strobe oscillation is effected, and the charging of the main capacitor C1 is effected.

When film winding ends, the oscillation starting switch SW1 is turned off and the abovementioned oscillation is stopped according to the results of the determination of the quantity of ambient light that is discussed in detail below.

When the release button is pressed, the oscillation starting switch SW1 is turned on, strobe oscillation is effected again, and the charging of the main capacitor C1 is effected.

After the pressing of the abovementioned release button, the determination of the quantity of ambient light by the phototransistor PH1 in the power circuit 20 is effected. According to the results of this determination (output of the phototransistor PH1), the switch SW3 in the automatic oscillation stopping circuit 30 is switched over so that a state is established wherein strobe flashing is allowed or forbidden.

The more detailed operations of the circuit linked to the results of the determination of the quantity of ambient light, discussed above in the strobe circuit 100 according to the present embodiment, are explained below.

In this strobe circuit 100, when the oscillation starting switch SW1 is pressed by the pressing of the release button, a starting current (direct current) flows through the path: battery BT (+: positive electrode) to coil L1 (terminal 2 to terminal 1) to switch SW1 to resistor R1 to coil L3 (terminal 3 to terminal 4) to transistor Q1 (B: base to E: emitter) to the battery BT (−: negative electrode). The transistor Q1 enters an on state because of this current and oscillation is initiated.

When the transistor Q1 enters the on state, current flows through the path: battery BT (+) to coil L1 (terminal 2 to terminal 1) to transistor Q1 (C: collector to E: emitter) to battery BT (−). A high voltage is induced in the coil L2 by the interlinked magnetic flux of the coil L1 on the coil L2 generated at this time.

Due to the high-voltage induced in this coil L2, current flows through a path: coil L2 (terminal 4) to transistor Q1 (B to E) to main capacitor C1 (plus to minus) to diode D1 (anode) to diode D1 (cathode) to coil L2 (terminal 5). At this time, the main capacitor C1 is charged with the half-wave rectified current, converted to direct current by the diode D1, as the charging current.

When the charging of the main capacitor C1 progresses and the voltage across both terminals thereof gradually rises, the voltage of the transistor Q1 (B) as seen from the main capacitor C1 (−) side also rises with the rise in the voltage across the terminals of the main capacitor C1. Along with this, the impedance of the main capacitor C1 increases as well and the charging current flowing through the following path is also reduced: coil L2 (terminal 4) to transistor Q1 (B) to transistor Q1 (E) to main capacitor C1 (plus) to main capacitor C1 (minus) to diode D1 (anode) to diode D1 (cathode) to coil L2 (terminal 5).

At the same time as the charging of the main capacitor C1 discussed above, the trigger capacitor C2 is charged by the current flowing through the path: coil L2 (terminal 4) to resistor R2 to the trigger capacitor C2 (plus to minus) to diode D1 (anode) to diode D1 (cathode) to coil L2 (terminal 5).

Figure 2:
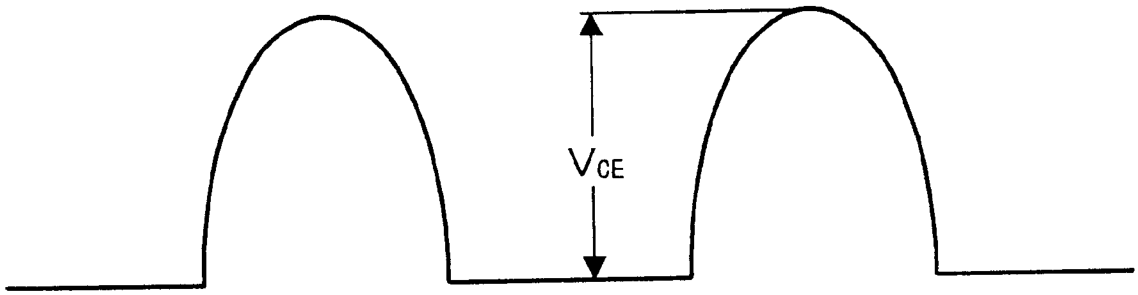
FIG. 2 is a diagram showing the oscillation wave form seen from the collector of the oscillation control transistor Q1.

During the oscillation and charging operations discussed above, the oscillation wave form as shown in FIG. 2 appears in the collector of the transistor Q1.

In the power circuit 20, this wave form (alternating current voltage VCE) is rectified with the rectifying diode D4 and a DC secondary source is generated from the smoothing action by the smoothing capacitor C3. The DC secondary source is applied to the phototransistor PH1 and transistor Q2 through the resistor R4.

In the case of bright ambient light with the circuit in this state, the phototransistor PH1 is turned on and the transistor Q2 off ("low" level) by the current flowing between the collector and emitter of the phototransistor PH1. Also, because the transistor Q2 is turned off, the solenoid RE1 is turned off and the aperture blades are kept in the minimum aperture state.

Furthermore, in connection with the aperture blades, the switch SW3 in the automatic oscillation stopping circuit 30 is switched to the contact a side. The light emitting diode LED1 in the automatic oscillation stopping circuit 30 is thereby turned off and the flash trigger circuit itself is turned off.

With the circuit in the state, a circuit comprising the resistor R3, switching diode D3, and switch SW3 (contact a) is connected in the automatic oscillation stopping circuit 30 and the charging voltage of the capacitor C1 is applied to this circuit.

When this applied voltage becomes the Zener voltage of the switching diode D3, a reverse bias current then begins to flow to the switching diode D3.

When this reverse bias current flowing in the path: step-up transformer T1 (terminal 5-terminal 4) to resistor R3 to switching diode D3, exceeds the current flowing in the path: step-up transformer (terminal 5–terminal 4) to transistor Q1 B-E, the transistor Q1 is turned off ("low" level) and oscillation is stopped.

After that, when the release button is pressed again, the shutter is released with the xenon lamp Xe1 not flashing. The xenon lamp Xe1 does not flash because at this time, the ambient light is bright and the switch SW3 is switched to the contact a side and the trigger switch SW2 and trigger capacitor C2 linked to the release button do not form a closed loop.

After the shutter is released, oscillation starts again because the oscillation starting switch SW1 remains on. The switch SW3 in the automatic oscillation stopping circuit 30 remains switched to the contact a side and the main capacitor C1 does not discharge. As a result, oscillation stops immediately when the finger is removed from the release button.

Meanwhile, in the power circuit 30, the abovementioned DC secondary source generated through the rectifying diode D4 and the smoothing capacitor C3 is applied to the phototransistor PH1. In the case where ambient light is low with the circuit in this state, the phototransistor PH1 is turned off, there is no conduction between the collector and emitter of the phototransistor PH1, and the transistor Q2 is turned on ("high" level).

Because the transistor Q2 is turned on, the DC secondary power source, stepped up (stepped up) by the initial battery voltage VB due to the amplifying action thereof, is applied to the solenoid RE1. The solenoid RE1 thereby is turned on and the aperture blades are kept in the open aperture state.

Furthermore, in connection to the aperture blades, the switch SW3 in the automatic oscillation stopping circuit 30 is switched to the contact b side. The light emitting diode LED1 in the automatic oscillation stopping circuit 30 is thereby turned on and the flash trigger circuit itself is turned on.

Under these conditions, a circuit through the resistor R3, switching diode D3, switching diode D2, light emitting diode LED1, and switch SW3 (contact b) is connected within the automatic oscillation stopping circuit 30. The charging voltage of the main capacitor C1 is applied to this circuit.

When this applied voltage then becomes the Zener voltage of the switching diodes D3 and D2 (sum of the Zener voltages of D3 and D2), current flows through the path: light emitting diode LED1 to switch SW3 (contact b), and the light emitting diode LED1 is lighted.

The lighting of this light emitting diode LED1 is to inform the user that the charging potential of the main capacitor C1 has reached the level at which flashing is possible and that the strobe is in a state at which the flashing operation may be effected at any time.

When the current flowing through the path: step-up transformer T1 (terminal 5 to terminal 4) to resistor R3 to switching diode D3 to switching diode D2 to light emitting diode LED1 to switch SW3 (contact b) to diode D1 exceeds the current flowing through the path: step-up transformer (terminal 5–terminal 4) to transistor Q1 (B to E), the transistor Q1 is turned off ("low" level) and oscillation is stopped.

Even when strobe oscillation stops, the light emitting diode LED1 remains lighted until the charging voltage of the main capacitor C1 becomes less than the Zener voltage of the switching diodes D3 and D2.

When the release button is pressed again during this interval, the shutter is released and the trigger switch SW2 linked to the release button is turned on. Because of the discharge from the trigger capacitor C2, current flows in the path: trigger capacitor C2 (+) to switch SW3 (contact b) to trigger switch SW2 to transformer T2 (primary side coil L4) to trigger capacitor C2 (–).

High voltage is thereby induced in the secondary side coil L5 from the primary side coil L4 of the transformer T2. This high voltage is applied to the trigger electrode of the xenon lamp Xe1 . The xenon lamp Xe1 is lighted when this applied voltage has risen to the breakdown voltage of the xenon lamp Xe1.

Because the oscillation starting switch SW1 remains on at the time when the shutter is released, oscillation begins again and charging of the main capacitor C1 is started once more.

As understood from the circuit operations discussed above, in the strobe circuit 100 according to the present invention, the position of the context of the switch SW3, on the contact b side or contact a side, at the time when the shutter is released (when the trigger switch SW2 is pressed) determines whether the xenon lamp Xe1 is lighted.

The position of the contact of the switch SW3 is determined according to the results of the determination of the quantity of ambient light by the phototransistor PH1. When ambient light is bright, this switch is switched to the contact a side for a state where flashing is not allowed and when ambient light is low, this switch is switched to the contact b side for a state where flashing is possible.

In the strobe circuit 100 according to the present invention, the aperture blade-driving solenoid RE1 operates on the condition that, when the oscillation starting switch SW1 is on, the AC voltage generated at the collector of the power switching transistor Q1 connected to the primary side of the step-up transformer T1 (oscillation control transistor) is rectified to direct current by the diode D4, smoothed by the smoothing capacitor C3, and then amplified by the amplifying action of the transistor Q2, whereby a DC secondary source that has been stepped up higher than the initial source voltage is established.

In the strobe circuit 100 according to the present invention, recharging of the main capacitor C1 begins immediately when the shutter is released once and the xenon lamp Xe1 flashes. When left without further action, however, oscillation automatically stops and the capacitor C1 progresses to natural discharge with the voltage through the path: resistor R3 to switching diode D3 to switch SW3 (contact a), or the path: resistor R3 to switching diode D3 to switching diode D2 to light emitting diode LED1 to switch SW3 (contact b) in the automatic oscillation stopping circuit 30.

When winding the film to the next frame, charging of the main capacitor C1 begins again and after the film is wound, the main capacitor C1 enters the natural discharge state discussed above due to being let stand.

In the case of strobe photography at this time, the release button is lightly pressed once (to an extent that the shutter is not released: half pressed state), oscillation is caused, and oscillation continues in that state for a short time until the light emitting diode LED1, indicating whether flashing is possible, is lighted. The shutter releasing operation may be performed at the time when the light emitting diode LED1 is lighted.

The close range light-quantity correction circuit 40 mounted in the strobe circuit 100 according to the present embodiment is explained next. This explanation concerns a configuration of the light-quantity correction switch SW4 that is operated manually by the user.

This light-quantity correction switch SW4 is normally held in the make state as shown in FIG. 1. When the release button is pressed with this circuit in that state, and the release button is pressed again when charging is finished (the shutter is released), the xenon lamp Xe1 is lighted by the operation of the circuit discussed above, and photocurrent flows in the anode and cathode of the xenon lamp Xe1 from the main capacitor C1 and is discharged through the light-quantity correction switch SW4.

At this time, in the close range light-quantity correction circuit 40, the capacitor C4 is in a state where it is short circuited by the switch SW4 and the potential is maintained at zero volts.

In this way, when the light-quantity correction switch SW4 is not operated (during the make state), the xenon lamp Xe1 is lighted to its fullest extent and strobe photography is performed.

Meanwhile, before the abovementioned photography, and in the case where it is determined that the user is too close to the subject being photographed, there is a risk of overexposure using normal strobe photography (full flashing), and it is necessary to use flashing correction, the user can deal with taking the photograph while the light-quantity correction switch SW4 is pressed.

At this time, the light-quantity correction switch SW4 is held in the break state while the user is pressing the switch.

When the release button is pressed with the switch in this state and charging is completed, then the release button is pressed again (shutter is released), and the xenon lamp Xe1 flashes.

At this time, however, because the light-quantity correction switch SW4 is in the break state, the capacitor C4 is not short circuited by the light-quantity correction switch SW4 and the photocurrent flowing from the main capacitor C1 to the anode and cathode of the xenon lamp Xe1 passes through circuit elements other than the switch SW4.

The specific circuit operations of the close range light-quantity correction circuit 40 at this time are explained with reference to FIG. 3.

Figure 3:
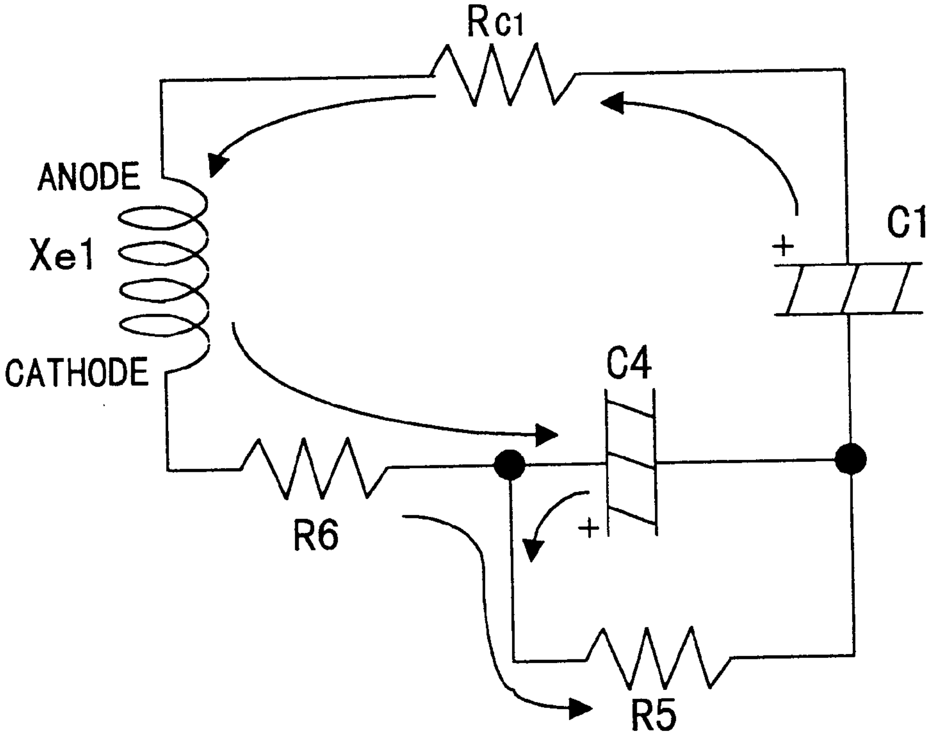
FIG. 3 is an equivalent circuit diagram of the close range light-quantity correction circuit 40 when the switch SW4 is in the break state.

FIG. 3 is an equivalent circuit diagram of the close range light-quantity correction circuit 40 when the light-quantity correction switch SW4 is in the break state. Moreover, in FIG. 3, RC1 is the line resistor between the main capacitor C1 and the xenon lamp Xe1.

As shown in FIG. 3, when the light-quantity correction switch SW4 is in the break state and the xenon lamp Xe flashes, the photocurrent flows from the main capacitor C1 to the anode and cathode of the xenon lamp Xe1. Photocurrent flowing through this cathode passes through the current limiting resistor R6 and charges the capacitor C4.

At the same time that this capacitor C4 is charged, discharge from the capacitor C4 through the resistor R5 is also effected.

The discharge voltage of the main capacitor C1 approaches the charging voltage of the capacitor C4 and the difference in potential between the anode and cathode of the xenon lamp Xe1 becomes the minimum stable voltage; flashing by the xenon lamp Xe1 stops at this time.

In other words, in the close range light-quantity correction circuit 40, when the light-quantity correction switch SW4 is pressed, the charging time of the capacitor C4 determined by the time constant of the resistor R5, resistor R6, and capacitor C4 becomes the exposure during strobe flashing. This becomes a lower value than exposure in the case where flashing is effected with the capacitor C1 only and the light-quantity correction switch SW4 is not pressed.

FIG. 4 is a drawing showing the charging and discharging properties of the capacitor C1 and the capacitor C4 when they discharge (flash) through the xenon lamp Xe1.

In FIG. 4, the curve A shows the charging and discharging properties of the main capacitor C1; the curve B shows the charging and discharging properties of the capacitor C4.

In FIG. 4, the main capacitor C4 is in a state with a charging voltage v3 at the initial position (P0) of flashing by the xenon lamp Xe1.

After this, flashing by the xenon lamp Xe1 continues during the period of time t1 and the main capacitor C4 has a gradually decreasing charging voltage because of its discharge. On the other hand, the capacitor C4 is charged by the discharge of the main capacitor C4 and has a gradually increasing charging voltage.

After flashing by the xenon lamp Xe1 begins, the time t1 passes; the charging voltage of the main capacitor C1 becomes v2 and the charging voltage of the capacitor C4 becomes v1. Flashing by the xenon lamp Xe1 stops at the point (P1) where the voltage difference between these becomes v4.

The voltage difference v4 between the discharge stopping voltage v2 of the main capacitor C1 and the maximum charging voltage v1 of the capacitor C4 is the voltage difference between the anode and cathode of the xenon lamp Xe1 (minimum stable voltage).

After this, the natural charging of the main capacitor C1 and the discharge of the capacitor C4 through the resistor R5 are continued for the time period t2.

As understood from the charging and discharging properties in this drawing, because the capacitor C4 causes the discharge of the main capacitor C1 to stop, the residual voltage in the main capacitor C1 remains a high voltage in the close range light-quantity correction circuit 40. For this reason, when the oscillation starting switch SW1 is thereafter turned on once more, charging can be completed within a short period of time.

As discussed above, in the strobe circuit 100 according to the present invention, the AC voltage generated in the collector of the oscillation control transistor Q1, connected to the primary side of the step-up transformer T1, is rectified to direct current in the power circuit 20 for driving the automatic exposure mechanism. The DC secondary source that is stepped up from the initial source voltage is thereby generated and used as the power source for driving the load for effecting mechanical operations.

With this configuration, the DC secondary source for the load for driving the aperture blades and so forth of the automatic exposure mechanism, for example, is generated within the strobe circuit. The burden on the battery source is therefore reduced by this secondary source for the load and it becomes possible to use a battery with a low nominal voltage. Moreover, it also becomes possible to extend battery life because the direct power consumption for driving the load from the battery source is suppressed.

Also, the circuit can be constituted with a very small number of elements such as the rectifying diode D4, the Zener diode ZD1, capacitor C3, phototransistor PH1, resistor R4, transistor Q2, and solenoid RE1. This can suppress cost increases from the load for driving the aperture blades and so forth.

Moreover, in the configuration of the power circuit 20 for driving the automatic exposure mechanism shown in FIG. 1, because the collector voltage wave form (see FIG. 2) of the transistor Q1 drops when the battery voltage VB drops, the Zener diode ZD1 forecasts of this voltage drop as well and it is necessary to establish the minimum voltage value at which the solenoid RE1 can operate. In the case of application to an actual circuit, it is preferable to set a somewhat higher voltage value in consideration of dispersion among the various elements.

Also, in the strobe circuit 100 according to the present invention, the switching diodes D2 and D3 are used as the voltage detection control elements in the automatic oscillation stopping circuit 30 that causes the oscillation operation to stop when the charging voltage of the main capacitor C1 connected to the secondary side of the step-up transformer T1 becomes a prescribed set voltage.

In effect, while it is usual to constitute the automatic oscillation stopping circuit (constant-voltage circuit) using a Zener diode as the voltage detection control element in a conventional device of this type, this circuit is formed using the Zener properties of switching diodes in the present invention.

Because the diodes have all the same properties, a rectifying diode with a low DC reverse voltage or other diodes may be used instead of the Zener diode. Of course, although the circuit constant is changed, the connections do not change.

The Zener voltage (VZ) of Zener diodes that are generally commercially available is related to the power consumption (P) and the Zener current (IZ) but generally fall into the following categories.

P=300 mW class: VZ=2 to about 42 volts

P=0.5 W class: VZ=up to about 200 volts

P=1 W class: VZ=up to about 330 volts

Voltage of the secondary side of the transformer T1 used in the strobe circuit is generally limited in range.

In the case of a strobe built-in a camera, the following values generally establish the range of voltages.

C1/WV: 270 to 330 volts (working voltage)

C1/SV: 300 to 360 volts (surge voltage)

Xe1/VS: 180 to 230 volts (minimum flashing voltage)

LED1 lighting voltage (Set value): 260 to 290 volts

Oscillation stopping voltage (Set value): 300 to 350 volts

The voltage conditions for lighting the light emitting diode LED1 are that the voltage must be equal to or higher than the minimum flashing voltage (VS) of the xenon lamp Xe1. Consequently, the VZ of the Zener diode used can be assumed to be within a voltage range of 200 volts to 330 volts.

However, there are few manufacturers who produce Zener diodes of this class, as well as few users. As a result, compared to the other electronic component Cs, few are produced and the price cannot be greatly reduced.

On the other hand, the switching diodes (D2, D3) in the automatic oscillation stopping circuit 30 according to the present invention are components that are generally available on the market; they are also low in cost. If used with sufficient understanding of their properties, it becomes possible to attain components that are more effective than conventional components with regards to the flexibility and costs of the circuit design.

The inventor of this application evaluated the properties of the switching diodes as below, presupposing their application to an automatic oscillation stopping circuit 30.

Figure 5A:
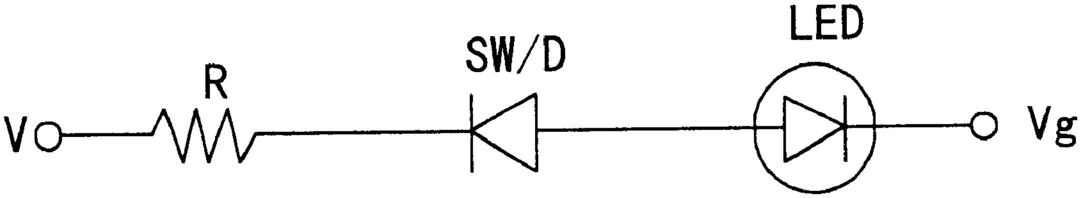
FIGS. 5(*a*) and 5(*b*) are diagrams showing the configuration of circuits for evaluating the properties of the switching diode.
Figure 5B:
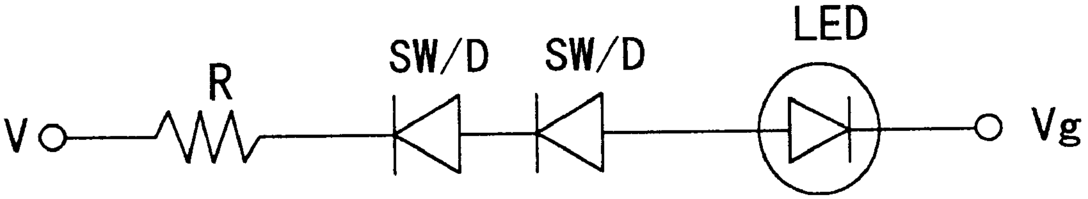

FIGS. 5(*a*) and 5(*b*) are drawings showing the configuration of the circuits used to evaluate the properties of the switching diodes.

The circuit shown in FIG. 5(*a*) has one switching diode, being evaluated, connected between a resistor R and an LED. The circuit shown in FIG. 5(*b*) has two switching diodes (SW/D), being evaluated, connected between a resistor R and an LED.

The inventor applied various types of components (Type A to Type E) having different reverse voltages (VR) to the switching diodes (SW/D) in these circuits. They performed a test by changing the DC resistor R and reading the reverse voltage VR when the reverse current became 1 mA and 1.4 mA.

FIGS. 6(*a*) through 6(*e*) are tables showing the properties in the tests where the subject was the circuit with one switching diode (see FIG. 5(*a*)). FIGS. 7(*a*) through 7(*f*) are tables showing the properties in the tests where the subject was the circuit with two switching diodes (see FIG. 5(*b*)).

As a result of evaluating the properties based on these tables, it is thought that the automatic oscillation stopping circuit 30 according to the present invention should be within the preferred range of values of VR=140 volts and R=433 or 473, attained with (Type B+Type E) shown in FIG. 7(*f*).

In the case of an actual design, however, more detailed experience and verification are necessary in order to satisfy the specified conditions.

In this way, because switching diodes D2, D3, that are inexpensive and commercially available, are used as the voltage detection control elements in the automatic oscillation stopping circuit 30 in the present invention, it is possible to reduce the costs of the circuit and to improve the flexibility of the circuit design as compared to conventional circuits using Zener diodes that are expensive and not produced in mass quantities.

The strobe circuit 100 according to the present invention includes a close range light-quantity correction circuit 40 comprising: a capacitor C4 connected serially between the main capacitor C1 and the xenon lamp Xe1, and a light-quantity correction switch SW4 that can be switched between a make state short circuiting the capacitor C4 and a break state that eliminates the short circuit; wherein, when the light-quantity correction switch SW4 is in the break state and the xenon lamp Xe1 flashes, this circuit causes the capacitor C4 to be temporarily charged by the discharge current from the main capacitor C1, causing a reduction of the difference in potential within the xenon lamp Xe1 and the discharge of the main capacitor C1 to stop.

The inclusion of this close range light-quantity correction circuit 40 can halt the discharge of the main capacitor C1, in effect the flashing by the xenon lamp Xe1, while in progress and can prevent overexposure during strobe photography at close ranges, due to operating so that the light-quantity correction switch SW4 enters the break state, as necessary, during strobe photography at close ranges.

Also, when this light-quantity correction switch function is started, charging can be completed in a short period of time when the oscillation starting switch SW1 is turned on once more and the process can move smoothly to the next photograph because the residual voltage of the main capacitor C1 is held at a level higher than normal after the photograph is taken.

The individual strobe units and flashes on cameras that are currently on the market include types having an automatic or manual light-quantity correction switch mechanism or types that do not have such a mechanism. Among these, the low-cost types generally do not have such a mechanism. The reason for this is the large number of parts used and the high price.

In recent years, however, as high sensitivity films with ISO sensitivity of 400 and 800 have come to be a commonly used, flashing correction during close range flash photography is coming to be very important function.

The close range light-quantity correction circuit 40 in the present invention can be realized inexpensively using a very small number of parts such as a capacitor C4, resistors R5, R6, and a switch SW1. This circuit is also very effective as a simple means for flashing correction for a normal flash that does not have an automatic light-quantity correction circuit.

Moreover, in the abovementioned embodiment, an example was discussed wherein the user manually operates the light-quantity correction switch SW4 in the close range light-quantity correction circuit 40. However, it is also possible to have a configuration such that flashing correction is effected automatically with the light-quantity correction switch SW4 linked to an automatic light modulating function.

Moreover, the present invention is not limited to the circuit configuration in FIG. 1 and can be modified appropriately within a scope that does not change its essential nature.

Examples of various modifications to the present invention are explained below with reference to FIGS. 8 through 14.

FIGS. 8 through 13 are circuit diagrams showing modifications to the power circuit 20 in FIG. 1. FIG. 14 is a circuit diagram showing a modification of the automatic oscillation stopping circuit 30 in FIG. 1. The same symbols are used for circuit elements having the same function as the circuit elements in the circuit shown in FIG. 1.

Figure 8:
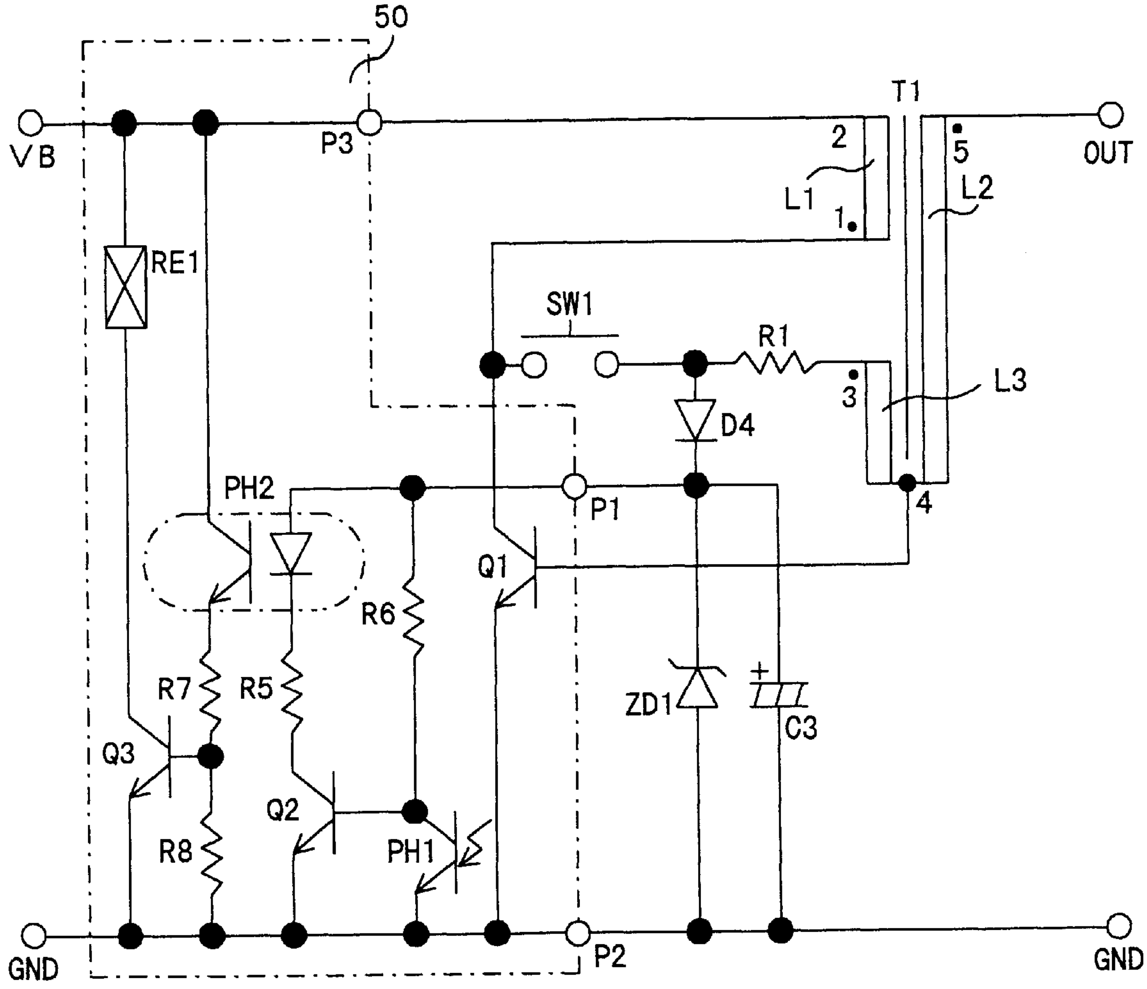
FIG. 8 is a circuit diagram of a first variation on the power circuit 20 for driving the automatic exposure mechanism.

In the power circuit according to a first modification shown in FIG. 8, the power source (VB) for the load (including the solenoid RE1) 50 for effecting mechanical operations (not limited to operating the aperture blades) is connected to another voltage system.

For this reason, in the circuit in FIG. 8, the signal from the light receiving element (photodiode PH1) is taken up through the transistor Q2 and optically connected by the photocoupler PH2, provided to the solenoid RE1 through the transistor Q3, and causes RE1 to operate.

Figure 9:
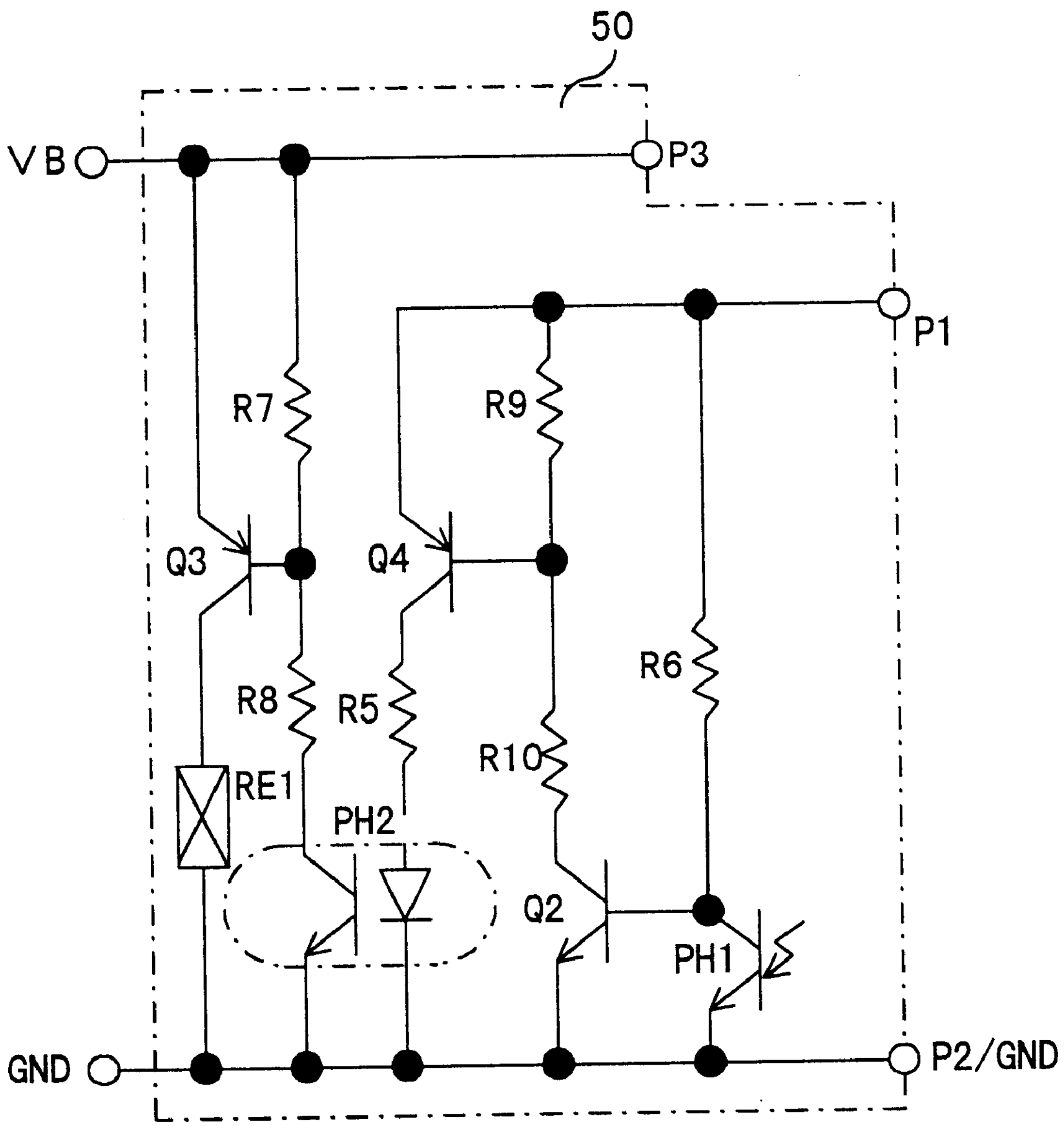
FIG. 9 is a circuit diagram of a second variation on the power circuit 20 for driving the automatic exposure mechanism.

The power circuit according to the second modification shown in FIG. 9 is a circuit wherein the signal from the light receiving element (photodiodes PH1) is reversed with respect to the circuit shown in FIG. 8 by the transistors Q3 and Q4. This circuit is similar to the circuit shown in FIG. 8 in that it operates to optically connect the signal from the light receiving element (PH1) with the photocoupler PH2 and causes the solenoid RE1 to operate.

Figure 10:
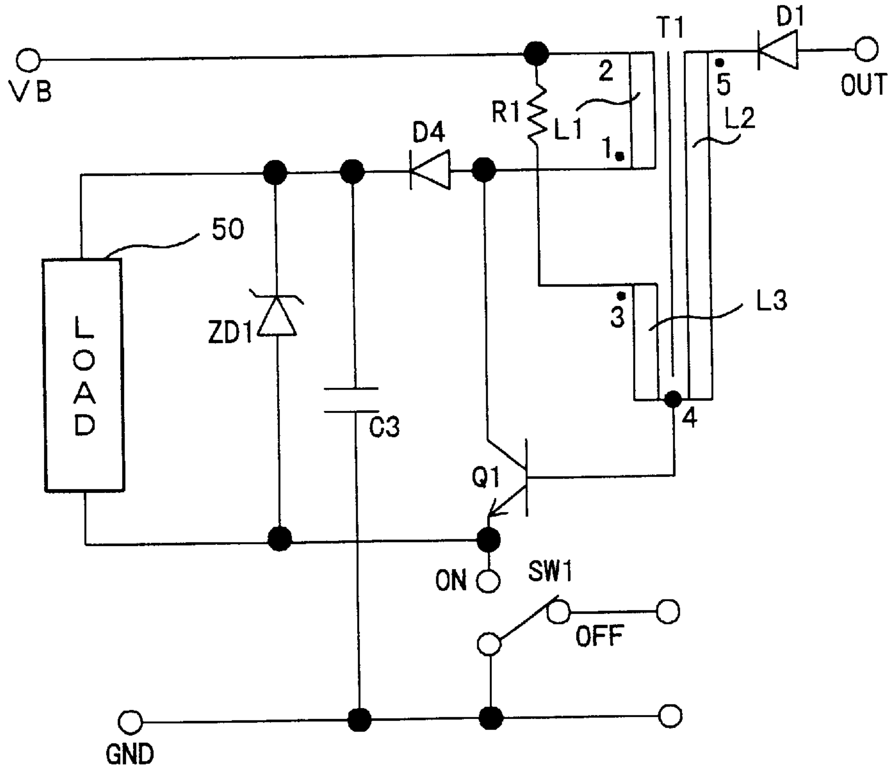
FIG. 10 is a circuit diagram of a third variation on the power circuit 20 for driving the automatic exposure mechanism.
Figure 11:
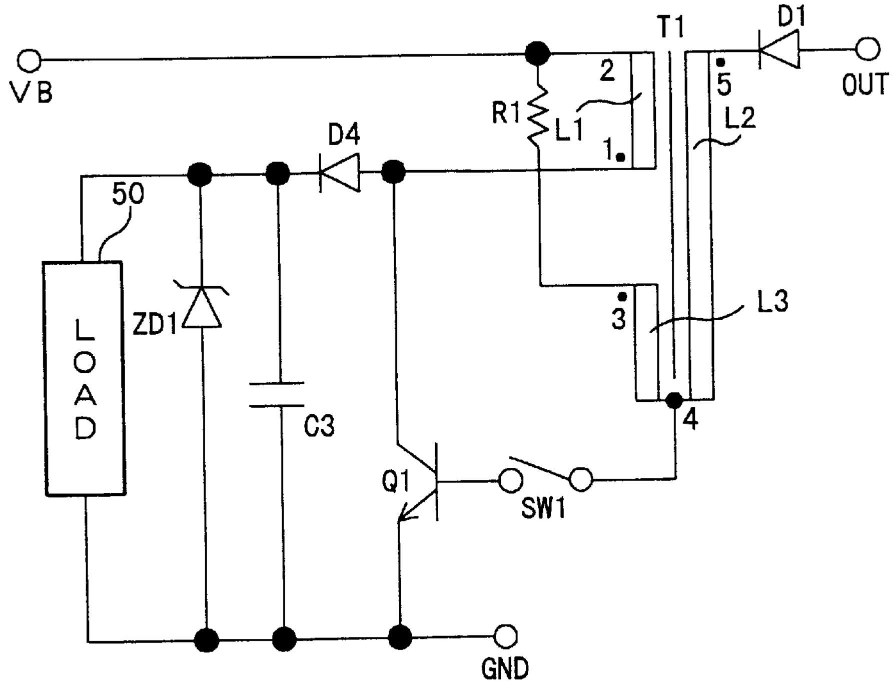
FIG. 11 is a circuit diagram of a fourth variation on the power circuit 20 for driving the automatic exposure mechanism.

A power circuit according to the third modification shown in FIG. 10 and the power circuit according to the fourth modification shown in FIG. 11 are circuits wherein the position at which the oscillation starting switch SW1 is disposed is different from the circuit shown in FIG. 1.

In either of the circuit shown in FIG. 10 and FIG. 11, the alternating current generated in the collector of the transistor Q1 is rectified and smoothed through the diode D4, capacitor C3, and Zener diode ZD1 and then supplied as the source to the load 50.

In the circuit configurations shown in FIG. 10 and FIG. 11, the position of the connections of the oscillation starting switch SW1 are different from the circuit shown in FIG. 1. As a result, the operation of the power circuit itself is governed by the switch SW1 being on or off and the power circuit also is set in an operating state only when the switch SW1 is in an on state.

Figure 12:
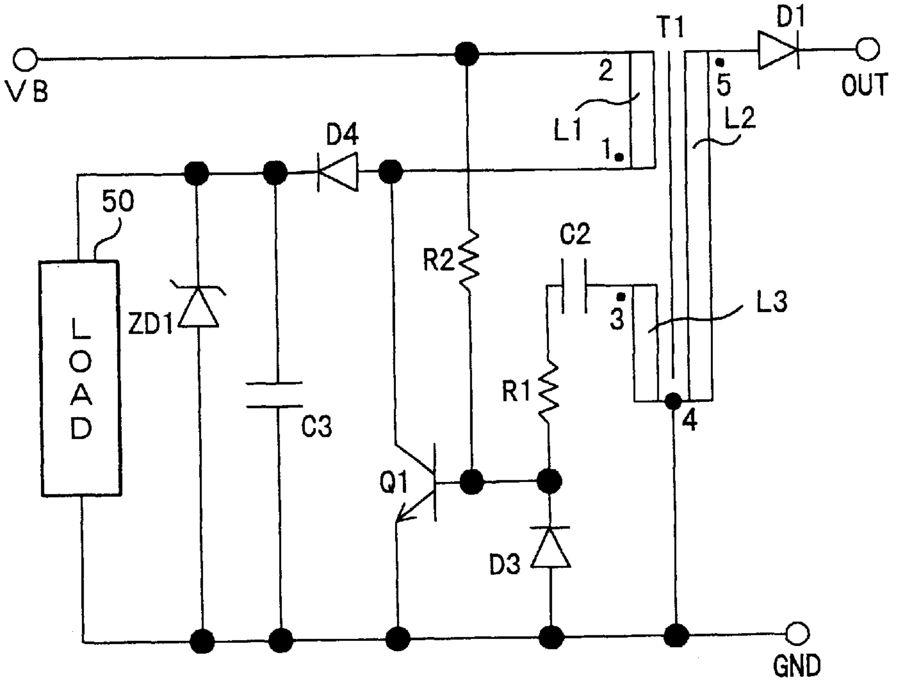
FIG. 12 is a circuit diagram of a fifth variation on the power circuit 20 for driving the automatic exposure mechanism.

The power circuit according to the fifth modification shown in FIG. 12 is an RCC strobe circuit used in digital still cameras and employs a system wherein the source for the load 50 is taken from the collector of the oscillation control transistor Q1.

Figure 13:
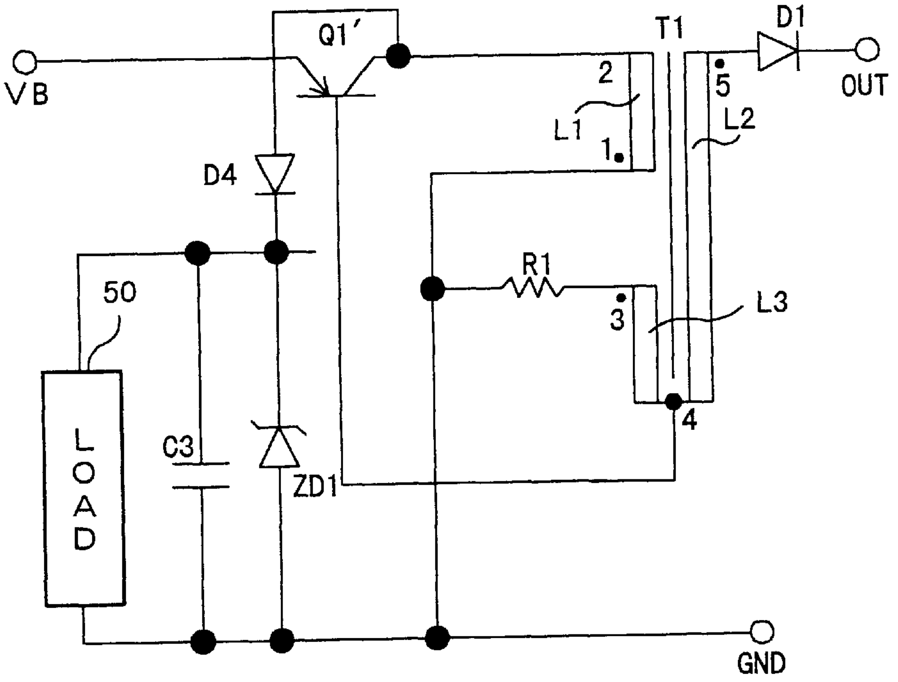
FIG. 13 is a circuit diagram of a sixth variation on the power circuit 20 for driving the automatic exposure mechanism.
Figure 14:
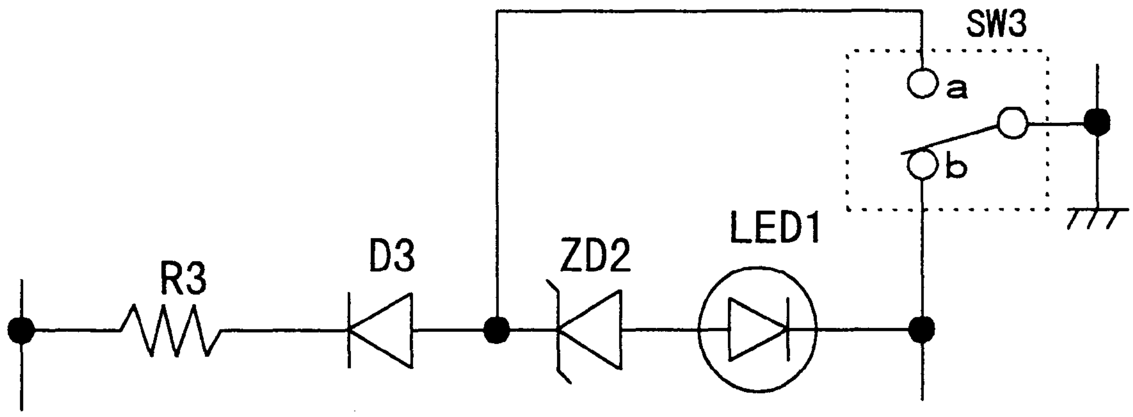
FIG. 14 is a circuit diagram of a variation on the automatic oscillation stopping circuit 30.

The power circuit according to the sixth modification shown in FIG. 13 is the strobe circuit using a PNP transistor Q1' for the oscillation control transistor. Like each of the modified circuits noted above, the source for the load 50 is taken from the collector of the transistor Q1'.

In the automatic oscillation stopping circuit shown in FIG. 14, the switching diode D2 in the automatic oscillation stopping circuit 30 in FIG. 1 is replaced by the Zener diode ZD2; both circuits operate in the same way.

Moreover, the resistor R3 in the automatic oscillation stopping circuit 30 in FIG. 1 is connected to the line of the fourth pin (terminal 4) of the step-up transformer T1, but the same effects may be achieved if it is connected to the third pin (terminal 3) of the step-up transformer T1.

Moreover, the abovementioned embodiments were discussed for the case of using the circuits as the strobe unit circuit for easy-use cameras such as a disposable camera, or compact cameras or digital still cameras. Otherwise, however, the present invention can also be used as a complete flash unit for a camera and can also be applied to light emitting circuits such as position detecting devices and moving body detecting devices.

What is claimed is:

1. A constant-voltage automatic charging strobe circuit in which battery voltage is stepped up by a step-up transformer and charges a main capacitor connected to a secondary side of the step-up transformer, while a flashing element connected in parallel with the main capacitor is caused to flash by the discharge current from the main capacitor, comprising:

a load for effecting mechanical operations; and a secondary power circuit distinct from said step-up transformer for rectifying to direct current an AC voltage generated in a collector of an oscillation control transistor connected to a primary side of the step-up transformer and generating a DC secondary source that has been stepped up higher than the battery voltage, wherein the load is driven by the DC secondary source.

2. The constant-voltage automatic charging strobe circuit, according to claim 1, further comprising a light-quantity correction circuit that has:

another capacitor connected serially between the main capacitor and the flashing element; and a light-quantity correction switch that can be switched between a make state in which the another capacitor is short circuited and a break state in which the short circuit of the another capacitor is eliminated;

wherein, when the flashing element is caused to flash with the light-quantity correction switch in the break state, the another capacitor is temporarily charged by the discharge current from the main capacitor, thereby reducing the difference in potential within the flashing element and stopping the discharge of the main capacitor.

3. The constant-voltage automatic charging strobe circuit, according to claim 1, further comprising an automatic oscillation stopping circuit for turning off the oscillation control transistor to stop an oscillation operation when the charging voltage of the main capacitor reaches a prescribed set voltage, with a set voltage detecting circuit portion thereof being constituted using a switching diode.

4. The constant-voltage automatic charging strobe circuit, according to claim 2, further comprising an automatic oscillation stopping circuit for turning off the oscillation control transistor to stop an oscillation operation when the charging voltage of the main capacitor reaches a prescribed set voltage, with a set voltage detecting circuit portion thereof being constituted using a switching diode.

5. A constant-voltage automatic charging strobe circuit in which battery voltage is stepped up by a step-up transformer and charges a first capacitor connected to a secondary side of the step-up transformer, while a flashing element connected in parallel with the first capacitor is caused to flash by a discharge current from the main capacitor, comprising:

a solenoid for driving aperture blades of an exposure adjusting mechanism; and a secondary power circuit for rectifying to direct current an AC voltage generated in a collector of an oscillation control transistor connected to a primary side of the step-up transformer and generating a DC secondary source that is stepped up higher than the battery voltage, the DC secondary source being supplied to the solenoid as a solenoid driving power source.

6. A constant-voltage automatic charging strobe circuit, according to claim 5, further comprising a light-quantity correction circuit that includes:

a second capacitor connected serially between the first capacitor and the flashing element; and a light-quantity correction switch that can be switched between a make state in which the second capacitor is short circuited and a break state in which the short circuit of the second capacitor is eliminated;

wherein, when the flashing element is caused to flash with the light-quantity correction switch in the break state, the second capacitor is temporarily charged by the discharge current from the first capacitor, thereby reducing the difference in potential within the flashing element and stopping the discharge of the first capacitor.

7. The constant-voltage automatic charging strobe circuit, according to claim 6, further comprising an automatic oscillation stopping circuit that includes:

a set voltage detecting circuit including a switching diode, for detecting that a charging voltage of the first capacitor reaches a prescribed set voltage; and a circuit for turning off the oscillation control transistor to stop an oscillation operation when the set voltage detecting circuit detects that the charging voltage of the first capacitor reaches the set voltage.

8. The constant-voltage automatic charging strobe circuit, according to claim 5, wherein the secondary power circuit includes a phototransistor which turns on or off according to whether a quantity of ambient light exceeds a prescribed threshold value or not, and the secondary power circuit generates the DC secondary source when the phototransistor is off while it stops the generation of the DC secondary source when the phototransistor is on.

9. The constant-voltage automatic changing strobe circuit, according to claim 6, wherein the secondary power circuit includes a phototransistor which turns on or off according to whether a quantity of ambient light exceeds a prescribed threshold value or not, and the secondary power circuit generates the DC secondary source when the phototransistor is off while it stops the generation of the DC secondary source when the phototransistor is on.

10. The constant-voltage automatic changing strobe circuit, according to claim 7, wherein the secondary power circuit includes a phototransistor which turns on or off according to whether a quantity of ambient light exceeds a prescribed threshold value or not, and the secondary power circuit generates the DC secondary source when the phototransistor is off while it stops the generation of the DC secondary source when the phototransistor is on.

11. The constant-voltage automatic changing strobe circuit, according to claim 8, wherein the solenoid is driven so that the aperture blades become a minimum aperture state, the supply of the DC secondary source is stopped when the phototransistor turns on, the solenoid is driven so that the aperture blades becomes an open aperture state, and the DC secondary source is supplied when the phototransistor turns on.

12. The constant-voltage automatic changing strobe circuit, according to claim 9, wherein the solenoid is driven so that the aperture blades become a minimum aperture state, the supply of the DC secondary source is stopped when the phototransistor turns on, the solenoid is driven so that the aperture blades becomes an open aperture state, and the DC secondary source is supplied when the phototransistor turns on.

13. The constant-voltage automatic changing strobe circuit, according to claim 10, wherein the solenoid is driven so that the aperture blades become a minimum aperture state, the supply of the DC secondary source is stopped when the phototransistor turns on, the solenoid is driven so that the aperture blades becomes an open aperture state, and the DC secondary source is supplied when the phototransistor turns on.

14. The constant-voltage automatic charging strobe circuit, according to claim 11, further comprising a switch for switching between a first contact side and a second contact side corresponding to a change in the state of the aperture blades between the minimum aperture state and the open aperture state, wherein discharge current from the first capacitor is cut off so as to prohibit a flash by the flash element when the switch is in the first contact side, while the discharge current from the first capacitor is caused to flow so as to cause the flash element to flash when the switch is in the second contact side.

15. The constant-voltage automatic charging strobe circuit, according to claim 12, further comprising a switch for switching between a first contact side and a second contact side corresponding to a change in the state of the aperture blades between the minimum aperture state and the open aperture state, wherein discharge current from the first capacitor is cut off so as to prohibit a flash by the flash element when the switch is in the first contact side, while the discharge current from the first capacitor is caused to flow so as to cause the flash element to flash when the switch is in the second contact side.

16. The constant-voltage automatic charging strobe circuit, according to claim 13, further comprising a switch for switching between a first contact side and a second contact side corresponding to a change in the state of the aperture blades between the minimum aperture state and the open aperture state, wherein discharge current from the first capacitor is cut off so as to prohibit a flash by the flash element when the switch is in the first contact side, while the discharge current from the first capacitor is caused to flow so as to cause the flash element to flash went the switch is in the second contact side.

* * * * *